(12) United States Patent
Scruggs et al.

(10) Patent No.: US 6,323,629 B1
(45) Date of Patent: Nov. 27, 2001

(54) CURRENT REGULATOR

(75) Inventors: Michael K. Scruggs, Pompton Plains; Serdar T. Sozusen, Pinebrook, both of NJ (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/589,461

(22) Filed: Feb. 23, 2000

(51) Int. Cl.[7] ............................................. G05F 3/08
(52) U.S. Cl. .................................................. 323/312
(58) Field of Search ........................... 356/472; 372/94; 323/282, 312, 351

(56) References Cited

U.S. PATENT DOCUMENTS

| 4,282,495 | 8/1981 | Ljung ........................... 331/94.5 S |
| 4,632,555 | * 12/1986 | Malvern ........................... 356/350 |
| 4,656,637 | 4/1987 | McCormick ........................ 372/38 |

OTHER PUBLICATIONS

Dr. James H. Sharp, Laser Gyroscopes, pp. 1–10, Date Unknown.

* cited by examiner

Primary Examiner—Adolf Deneke Berhane
(74) Attorney, Agent, or Firm—Loria B. Yeadon

(57) ABSTRACT

A current regulator for a laser tube used in a ring laser gyroscope includes a ballast resistor coupled to the laser tube's anode, an output for the current, such as a current sensing resistor, a current source coupled between the ballast resistor and the output, a control circuit that establishes the amount of current flow through the current regulator, and a voltage divider that senses the voltage across the current source. The current source includes two transistors coupled in series and the voltage divider generates a voltage level that is half the sensed voltage differential and supplies the generated voltage level to one of the transistors so as to control the voltage drop across that transistor to be the same as the voltage drop across the other transistor. The current source may include more than two transistors in series and the voltage drops across the transistors are controlled to be the same.

19 Claims, 2 Drawing Sheets

CURRENT REGULATOR

FIELD OF INVENTION

The present invention relates to a current regulator and more particularly to a current regulator designed especially for use with a ring laser gyroscope.

BACKGROUND OF INVENTION

Inertial navigational systems generally include gyroscopes, such as ring laser gyroscopes, to sense rotation about different axes. In the ring laser gyroscope, the HeNe glow discharge of the laser tube is controlled by a high voltage power supply operating in conjunction with a current regulator.

As is known in the art, a common cathode of the laser tube operates with two anodes whose current must be regulated to control the glow discharge and to maintain constant tube intensity. The current regulator typically is implemented with an operational amplifier feedback loop and a transistor.

FIG. 1 illustrates a typical current regulator design for use with a gas laser tube. As shown, a power supply 10 generates a high voltage to operate a laser tube 12. The high voltage is applied to the tube's cathode 12c. The tube current is controlled by identical current regulators coupled to the tube's anodes 12a. Each current regulator includes a ballast resistor 14, an operational amplifier 16, a transistor 18, a current sense resistor 20, and a reference voltage Vref 22. Generally, each transistor 18 is a P-channel fet with a voltage rating of 450 VDC.

During operation, for each current regulator, operational amplifier 16 drives transistor 18 to maintain a constant voltage drop across current sense resistor 20. The current is controlled to a value of the reference voltage Vref divided by the value of current sense resistor 20. In a typical operation, transistor 18 is biased to have a 100 to 200 voltage across it, which generally requires that power supply 10 be tightly regulated to account for voltage variations occurring as a function of temperature within laser tube 12. Voltage variations also occur throughout the natural life of laser tube 12.

Moreover, to protect each transistor 18 from the high voltages that are required for the anode, each current regulator is provided with protection diodes 24. Unfortunately, these protection diodes place a severe limitation on the dynamic range of the current regulator, typically limiting operation to approximately 320 VDC.

This limitation, in turn, forces tight regulation requirements on the power supply design, and requires large values for the ballast resistor 14. Moreover, the design requires that the value of the ballast resistor 14 change for different current levels. These problems are particularly acute due to the substantial difference between the start-up voltage (e.g., 3000 VDC) and the operating-run voltage (e.g., 1000 VDC) applied to the laser tube's cathode required with typical gyroscopes.

It is therefore an object of the present invention to provide a current regulator that has a wide dynamic range and large operating voltage capability, that uses a lower value ballast resistor, and that requires lower power supply voltage regulation.

Various other objects, advantages and features of the present invention will become readily apparent to those of ordinary skill in the art, and the novel features will be particularly pointed out in the appended claims.

SUMMARY OF THE INVENTION

In accordance with the present invention, the current regulator includes a current source that achieves a greater operating range than that of existing regulators by utilizing a voltage divider to provide for incremental voltage level drops across multiple transistors placed in series.

In accordance with an embodiment of the present invention, an apparatus for use in a ring laser gyroscope comprises a laser tube having a cathode and at least one anode, a power supply for powering the laser tube, and a current regulator coupled to the anode. The current regulator includes the current source for current flowing from or to the laser tube and the current source is adapted to provide incremental voltage level drops, the current source comprises first and second transistors coupled in series.

As another aspect, the current regulator includes a voltage divider adapted to control the voltage level drop across at least one of the transistors as a function of the voltage potential at the laser tube's anode.

In accordance with another embodiment of the present invention, a current regulator for use in a ring laser gyroscope comprises a ballast resistor coupled to an anode of the gyroscope's laser tube, an output for the current, a current source coupled between the ballast resistor and the output, a control circuit that establishes the amount of current flow through the current regulator, and a voltage divider that senses the voltage across the current source. The current source includes two transistors coupled in series, the first transistor being coupled to the output and the second transistor being coupled to the ballast resistor. The voltage divider generates a divided voltage as a function of the sensed voltage differential and supplies the divided voltage to the second transistor to control the second transistor so that a voltage drop across the second transistor is equal to a voltage drop across the first transistor.

As an aspect of this embodiment, the output for the current source is a current sense resistor that is coupled to ground, and the control circuit controls the voltage across the current sense resistor.

As another aspect, a zener diode is coupled between the second transistor and the voltage divider to protect the second transistor from excessive voltages applied across it.

As a further aspect, the voltage divider is comprised of two equal value resistors coupled in series, and the divided voltage is the voltage level at which the two resistors are coupled.

In accordance with a further embodiment of the present invention, the current regulator comprises the abovementioned ballast resistor, output, control circuit, current source and voltage divider. However, the current source in this second embodiment includes a first transistor and a plurality of second transistors, all coupled in series, wherein each of the second transistors is controlled by a respective output of the voltage divider to cause the voltage drop across all of the second transistors to be the same as the voltage drop across the first transistor.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE INVENTION

In accordance with the present invention, an improved current regulator solves the aforementioned problems, while at the same time does not utilize protection diodes in a manner that limits the dynamic range of the current regulator.

Figure 2:
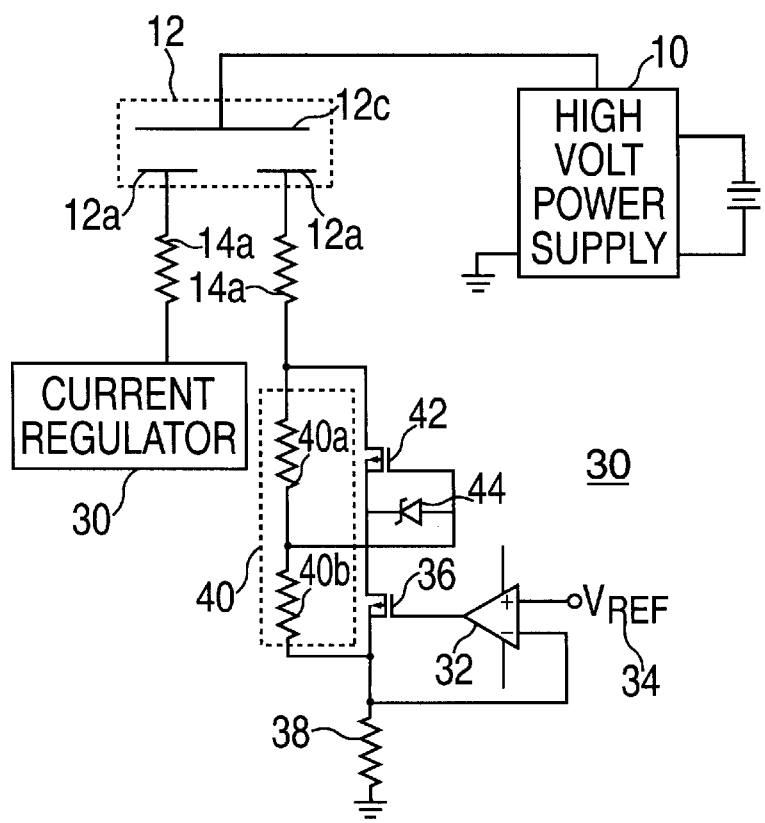
FIG. 2 schematically illustrates the design of a current regulator for use with a laser tube in accordance with the present invention.

Referring now to FIG. 2 of the drawings, a ring laser gyroscope includes a power supply 10, a laser tube 12 having common cathode 12c and two anodes 12a, a ballast resistor 14a, and two current regulators 30. For convenience, the specific design of only one of the current regulators is shown.

The improved current regulator 30 of the present invention is coupled to ballast resistor 14a and includes an operational amplifier 32, a reference voltage Vref 34, a first transistor 36 and a current sense resistor 38. Operational amplifier 32, first transistor 36 and current sense resistor 38 operate in a manner similar to operational amplifier 16, transistor 18 and current sense resistor 20, previously discussed. Of course, operational amplifier 16 may be replaced with known equivalent control circuits.

Current regulator 30 further includes a voltage divider 40, comprised of identical valued resistors 40a and 40b, a second transistor 42 and a zener diode 44.

During operation, voltage reference Vref 34 is held constant or varied as required. Operational amplifier 32 maintains the voltage across current sense resistor 38 to equal voltage reference Vref 34 and, thus, the current through resistor 38 is established.

Voltage divider 40 senses the voltage differential across first and second transistors 36 and 42, and drives second transistor 42 to have a voltage across it of one half the sensed voltage differential. The voltage drops across the first and second transistors 36 and 42 therefore are driven to be equal.

As higher voltage levels are seen at the laser tube's anode 12a, the voltage drops across transistors 36 and 42 increase maintaining a constant current through circuit 30. Preferably, current flow through voltage divider 40 is negligible (e.g., 1, 2%) as compared to the current flow through the transistors. The circuit's resistors operate as voltage dividers and the transistors operate as a current source.

Figure 1:
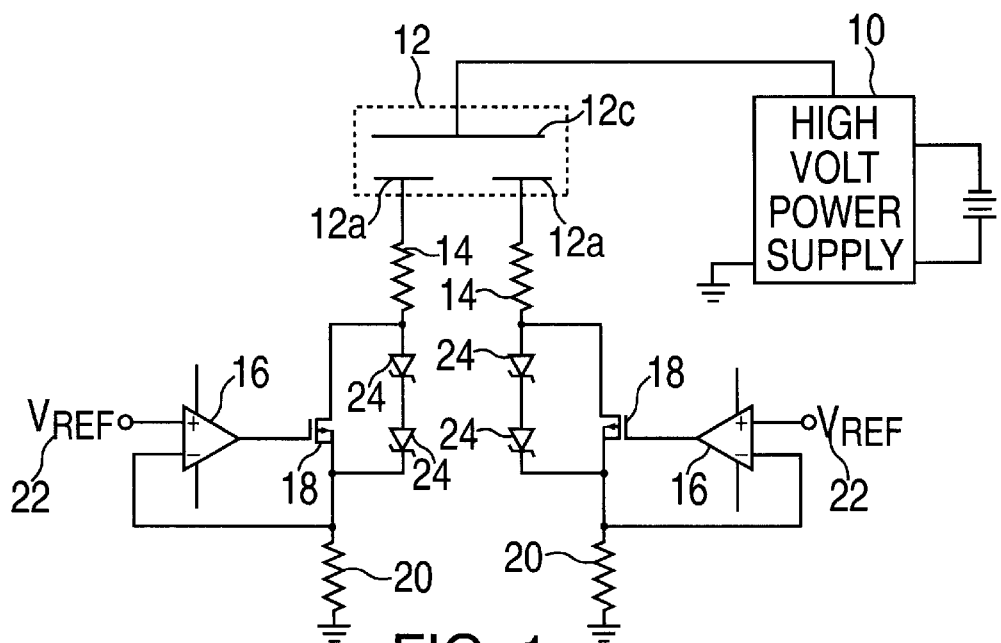
FIG. 1 schematically illustrates the design of a typical current regulator for use with a laser tube.

By providing two transistors in conjunction with a voltage divider and without a protection diode that limits the dynamic range of either transistor, the current regulator of the present invention has an operating range that is more than double that of the existing design shown in FIG. 1. A typically operating range of current regulator 30 of the present invention is 800 VDC.

Current regulator 30 further includes diode 44, preferably a low voltage diode, that protects second transistor 42 from excessive gate-source voltages.

Figure 3:
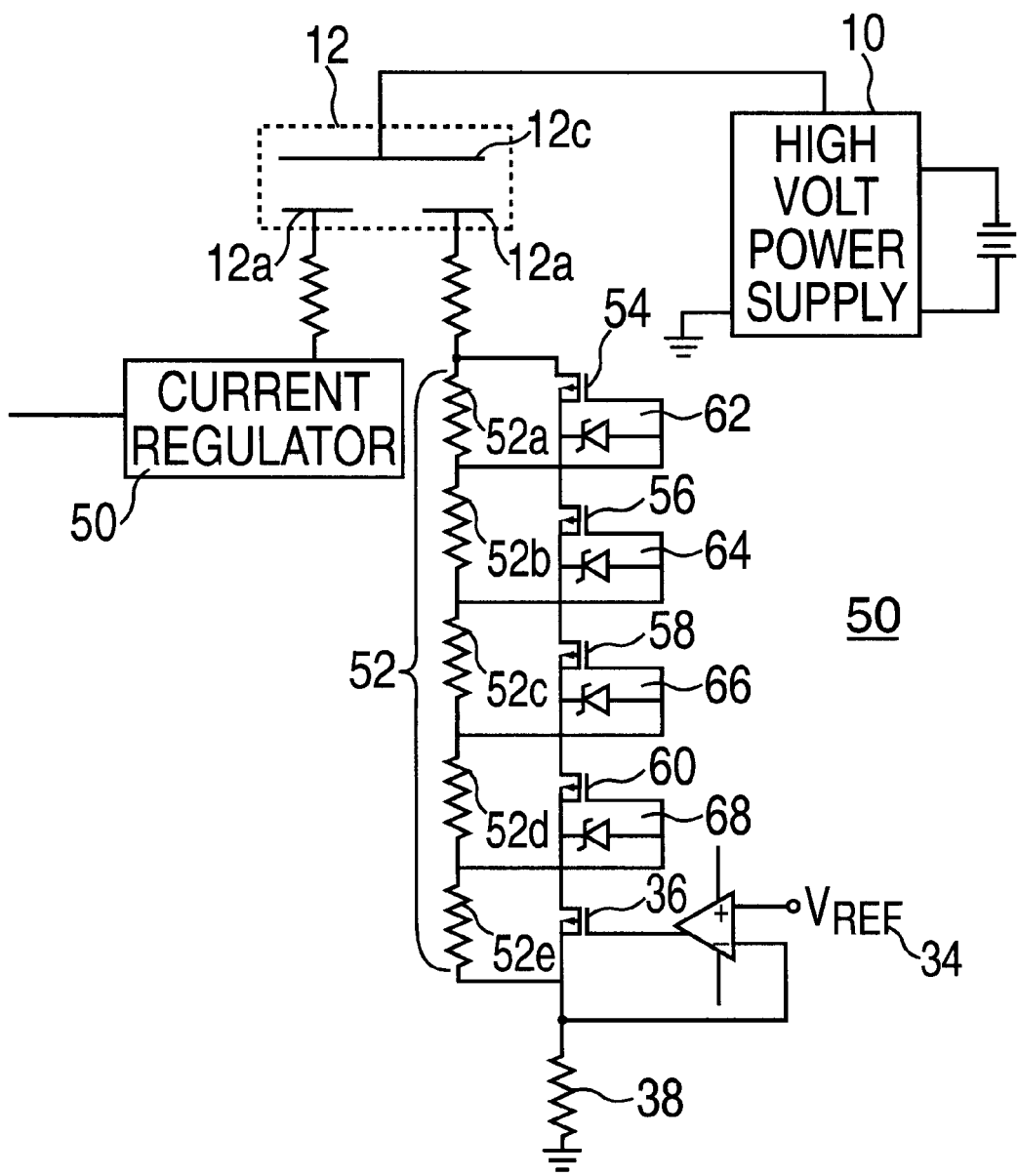
FIG. 3 schematically illustrates the design of another current regulator for use with a laser tube in accordance with another embodiment of the present invention.

Referring now to FIG. 3 of the drawings, a current regulator 50 in accordance with another embodiment of the present invention is shown. Current regulator 50 operates in a manner similar to current regulator 30 shown in FIG. 2, but includes multiple stages of transistors as well as resistors within the voltage divider to extend the current regulator's operating range to any desired voltage.

As shown in FIG. 3, current regulator 50 includes operational amplifier 32, reference voltage Vref 34, first transistor 36 and current sense resistor 38, all which operate in the same manner previously discussed with respect to the design shown in FIG. 2. Current regulator 50 further includes a voltage divider 52, comprised of identical valued resistors 52a, 52b, 52c, 52d and 52e, transistors 54, 56, 58 and 60, and zener diodes 62, 64, 66 and 68.

Similar to the design shown in FIG. 2, the outputs of voltage divider 52 maintain equal voltage drops across each of the transistors. The operating range of current regulator 50 is approximately 2500 VDC. Of course, other numbers of stages of transistors may be utilized to provide different operating ranges.

While the present invention has been particularly shown and described in conjunction with preferred embodiments thereof, it will be readily appreciated by those of ordinary skill in the art that various changes may be made without departing from the spirit and scope of the invention. For example, while the present invention has been described for use with laser tubes generally utilized for gyroscopes, the present invention is not limited thereto and may be applied to regulate current within high voltage circuits in general.

As another example, although the designs shown herein are actually negative current regulators, positive current regulators are easily derived from the teachings herein and are considered to be part of the present invention.

As a further example, while the designs shown herein utilize equal voltage divisions so that voltage drops across the plural transistors are the same, the present invention incorporates use of different valued resistors so that the voltage drops across the transistors may be different.

Therefore, it is intended that the appended claims be interpreted as including the embodiments described herein, the alternatives mentioned above, and all equivalents thereto.

We claim:

1. A current regulator for use in a ring laser gyroscope having a laser tube powered by a power supply, the laser tube providing a glow discharge and having a cathode and first and second anodes, the current regulator comprising:

a ballast resistor having one end coupled to one of said first and second anodes of the laser tube;

output means for supplying an output for current flowing through said current regulator;

a current source coupled between the ballast resistor and the output means, the current source comprising first and second transistors coupled in series, said second transistor being coupled to said ballast resistor, and said first transistor being coupled to said output means;

a control circuit coupled to both said first transistor and said output means for establishing a preselected amount of current being supplied through said output means; and a voltage divider for sensing the voltage differential across said current source, for generating a divided voltage as a function of the sensed voltage differential, and for supplying the divided voltage to said second transistor to control said second transistor so that a voltage drop across said second transistor is equal to a voltage drop across said first transistor.

2. The current regulator of claim 1, wherein said output means is a current sense resistor coupled to ground, and the control circuit controls a voltage differential across the current sense resistor.

3. The current regulator of claim 1, further comprising a zener diode coupled between the second transistor and the voltage divider for protecting the second transistor from excessive voltages applied across it.

4. The current regulator of claim 1, wherein the voltage divider is comprised of first and second resistors coupled in series, the first and second resistors of the voltage divider having the same value, and the divided voltage is the voltage at which the first and second resistors are coupled.

5. The current regulator of claim 1, wherein the dynamic range of the current regulator is in excess of 500 VDC.

6. A current regulator for use in a ring laser gyroscope having a laser tube powered by a power supply, the laser tube providing a glow discharge and having a cathode and first and second anodes, the current regulator comprising:
   a ballast resistor having one end coupled to one of said first and second anodes of the laser tube;
   output means for supplying an output for current flowing through said current regulator;
   a current source coupled between the ballast resistor and the output means, the current source comprising a first transistor and a plurality of second transistors, said plurality of second transistors being coupled in series, a first one of said second transistors being coupled to said ballast resistor, and said first transistor being coupled between a last one of said second transistors and said output means;
   a control circuit coupled to both said first transistor and said output means for establishing a preselected amount of current being supplied through said output means; and
   a voltage divider for sensing the voltage differential across said current source, for generating a plurality of divided voltages of different values as a function of the sensed voltage differential, and for supplying a respective one of the divided voltages to each of said second transistors to control said second transistors so that a voltage drop across each of said second transistors is equal to a voltage drop across said first transistor.

7. The current regulator of claim 6, wherein said output means is a current sense resistor coupled to ground, and the control circuit controls a voltage differential across the current sense resistor.

8. The current regulator of claim 6, further comprising a plurality of zener diodes, each of said zener diodes being coupled between a respective one of the second transistors and the voltage divider for protecting the respective second transistor from excessive voltages applied across it.

9. The current regulator of claim 6, wherein the voltage divider is comprised of a plurality of equal value resistors coupled in series, and the plurality of divided voltages correspond to voltage levels at which respective pairs of said plurality of resistors are coupled.

10. The current regulator of claim 6, wherein the dynamic range of the current regulator is in excess of 2000 VDC.

11. A current regulator for regulating an amount of current flowing from a laser powered by a power supply, the current regulator comprising:
   a ballast resistor adapted to have one end coupled to the laser;
   output means for providing an output for current flowing through said current regulator;
   a current source coupled between the ballast resistor and the output means, the current source comprising a plurality of transistors coupled in series, a first of said transistors in said series being coupled to said output means, and a last of said transistors in said series being coupled to said ballast resistor;
   a control circuit for establishing a preselected amount of current being supplied through said output means; and
   voltage divider means for sensing the voltage differential across said current source, for generating at least one divided voltage as a function of the sensed voltage differential, and for supplying the at least one divided voltage to control at least one of said transistors so that a voltage drop across each of said transistors is the same.

12. The current regulator of claim 11, further comprising at least one zener diode coupled between one of the transistors and the voltage divider for protecting the respective transistor from excessive voltages applied across it.

13. A current source for regulating current flow through an element to an output, the current source comprising:
   a plurality of transistors connected in series, a first of said transistors being connected to the output and the last of said transistors being connected to the element;
   a control circuit for establishing a preselected amount of current being supplied to the output; and
   voltage divider means for sensing the voltage differential across the current source, for generating at least one divided voltage as a function of the sensed voltage differential, and for supplying the at least one divided voltage to control at least one of said transistors so that a voltage drop across each of said transistors is the same.

14. The current source of claim 13 wherein said plurality of transistors comprises two transistors.

15. The current source of claim 13 wherein said plurality of transistors is greater than two.

16. The current source of claim 13 further comprising a ballast resistor connected between said last of said transistors and the element.

17. The current source of claim 13 further comprising a zener diode connected between said last of said transistors and said voltage divider means.

18. The current source of claim 13 wherein the output comprises a current sense resistor connected to ground, said control circuit being connected to the current sense resistor and responsive to the voltage across the current source resistor.

19. Apparatus for use in a ring laser gyroscope, comprising:
   a laser tube having a cathode and at least one anode;
   a power supply for powering said laser tube; and
   a current regulator coupled to said at least one anode, said current regulator including a current source for current flowing from or to said laser tube, said current source comprising first and second transistors coupled in series, and said current regulator further including a voltage divider adapted to control the voltage level drop across at least one of said first and second transistors as a function of the voltage potential at said at least one anode of said laser tube, whereby said current source is adapted to provide a plurality of incremental voltage level drops.

* * * * *